United States Patent Office 2,700,678
Patented Jan. 25, 1955

2,700,678

TRI-NORMALBUTYL AMINE SALT OF α,α-DICHLOROPROPIONIC ACID

George W. Scoles, Hemlock, Mich., assignor to The Dow Chemical Company, Midland, Mich., a corporation of Delaware No Drawing. Application September 18, 1953,
Serial No. 381,110

1 Claim. (Cl. 260—501)

This invention is concerned with the tri-normalbutyl amine salt of α,α-dichloropropionic acid having the following formula

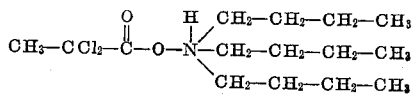

This compound is a crystalline solid somewhat soluble in many organic solvents and water. The novel compound has been tested and found active as a herbicide, and is adapted to be employed in spray and dust compositions for the control of the growth and the killing of weeds and for the sterilization of soil with regard to plant growth.

The new compound may be prepared by reacting α,α-dichloropropionic acid with tri-normalbutyl amine. In carrying out the reaction, the reactants may be added portionwise one to the other with stirring. In an alternative method, the reagents may be contacted in water or an organic solvent such as xylene. The amount of the α,α-dichloropropionic acid and tri-normalbutyl amine to be employed is not critical, some of the desired product being obtained with any proportion of ingredients. Good results are obtained when operating at temperatures of from about 20° to 100° C. and when employing substantially equimolecular proportions of the reactants. The reaction is somewhat exothermic, the temperature being controlled by regulation of the rate of contacting the reactants and by the addition and subtraction of heat, if required.

In a representative operation, 32.1 grams (0.173 mole) of tri-normalbutyl amine was added portionwise with stirring to 24 grams (0.168 mole) of α,α-dichloropropionic acid dissolved in 35.3 grams of a petroleum distillate boiling at from 340° to 540° F. (Penola heavy aromatic naphtha). During the addition, which was carried out over a period of about 15 minutes, the temperature of the reaction mixture gradually increased but did not exceed about 75° C. Following the addition, seven grams of an emulsifying and wetting agent, a dimeric alkylated aryl polyether alcohol (Triton X-155), was added to the hot reaction mixture. The resulting mixture was then diluted to a volume of 100 milliliters by the further addition of a small amount of naphtha reaction solvent and allowed to cool to room temperature. During the cooling an α,α-dichloropropionic acid tri-normalbutyl amine salt product precipitated as a crystalline solid and was sepaarted by filtration and dried. The mother liquor from the filtration operation was then cooled to 0° F., a further small amount of the α,α-dichloropropionic acid tri-normalbutyl amine salt precipitating therein as a crystalline solid. The latter was also separated by filtration and dried and the dried product recrystallized from acetone. Tri-normalbutyl amine α,α-dichloropropionate is a white colored crystalline material having a melting point of 74°–75.2° C.

In an additional operation, 31.1 grams (0.168 mole) of tri-normalbutyl amine was added portionwise with stirring and cooling to 24 grams (0.168 mole) of α,α-dichloropropionic acid. During the addition, which was carried out over a period of about 15 minutes, the temperature rose to about 71° C. Following the addition, the reaction mixture was allowed to cool to room temperature. During the cooling period, the mixture became a crystalline mass. This solid product was washed with Penola heavy aromatic naphtha and dried. The dried product was the tri-normalbutyl amine salt of α,α-dichloropropionic acid.

In another operation, 92.6 grams (0.5 mole) of tri-normalbutyl amine was added portionwise with stirring and cooling to a mixture of 71.5 grams (0.5 mole) of α,α-dichloropropionic acid and 71.5 grams of a petroleum distillate fraction boiling at from about 315° to 390° F. (Stoddard solvent). During the addition, which was carried out over a period of about 15 minutes, the temperature of the reaction mixture rose to about 49° C. Following the addition, the mixture was set aside overnight during which period a product precipitated therein as a crystalline solid. The latter was separated by filtration, washed with a petroleum distillate fraction boiling at from 230°–242° F. (Penola octane) and recrystallized from acetone. As a result of these operations there was obtained the tri-normalbutyl amine salt of α,α-dichloropropionic acid.

The new α,α-dichloropropionic acid salt has been found effective for the control of the growth of plants and is adapted to be employed for the killing of many weeds. In such use the salt may be dispersed upon a finely divided solid and employed as a dust. In other procedures, the new salt may be employed in oils, as a constituent in oil in water emulsions or in water solutions or dispersions with or without the addition of wetting and dispersing agents.

In an operation illustrative of the herbicide effectiveness of the new growth control agent, an aqueous spray mixture containing 1.5 pounds acid-equivalent of the toxicant per 100 gallons was applied to young corn plants at a dosage of 1.5 pounds acid-equivalent of toxicant per acre. Two weeks after the application, an 85 percent control of the corn plants was observed.

I claim:

Tri-normalbutyl amine salt of α,α-dichloropropionic acid.

No references cited.